United States Patent [19]

Iijima

[11] Patent Number: 4,744,826
[45] Date of Patent: May 17, 1988

[54] INK COMPOSITION

[75] Inventor: Zenshiro Iijima, Abiko, Japan

[73] Assignee: Adger Kogyo Co., Ltd., Japan

[21] Appl. No.: 890,283

[22] Filed: Jul. 29, 1986

[30] Foreign Application Priority Data

Aug. 6, 1985 [JP] Japan ................ 60-172636

[51] Int. Cl.$^4$ .................................... C09D 11/00
[52] U.S. Cl. ................................. 106/20; 106/19
[58] Field of Search ................... 106/20, 19

[56] References Cited

U.S. PATENT DOCUMENTS 4,154,618 5/1979 Burke .................... 106/30
4,243,430 1/1981 Sperry et al. ............ 106/308 M

*Primary Examiner*—Amelia Burgess Yarbrough
*Attorney, Agent, or Firm*—Lorusso & Loud

[57] ABSTRACT

An aqueous transparent ink composition affording white ink patterns which are erasable with weakly acidic or ammoniacal liquid, and including an aqueous medium, and an ammine complex salt of zinc dissolved in the aqueous medium.

5 Claims, No Drawings

INK COMPOSITION

This invention relates generally to an ink composition and, more specifically, to an aqueous transparent ink composition affording erasable, white ink patterns.

There are a lot of known ink compositions affording white ink images on a dark or black paper or cloth. Since the known ink compositions are generally composed of a white pigment dispersed in a suitable liquid medium, they encounter a problem of precipitation of the pigment during storage. Additionally, they cannot be used for felt-tip pens.

The present invention is aimed at the provision of a novel, transparent ink composition affording white written patterns. It is a special object of the present invention to provide an ink composition capable of being easily erased with an acidic or ammoniacal liquid. It is a further object of the present invention to provide an ink composition of the above-mentioned type which can be suitably used for felt-tip pens.

In accordance with the present invention there is provided an ink composition in the form of an alkaline solution comprising an aqueous medium, and an ammine complex salt of zinc dissolved in said aqueous medium.

In another aspect, the present invention provides a writing instrument, such as a felt-tip pen, containing the above ink composition.

The ink composition of the present invention may be preferably prepared by a method including the steps of mixing an aqueous solution of a zinc compound such as zinc halide or zinc sulfate with an aqueous solution of an alkali metal hydroxide such as sodium hydroxide or potassium hydroxide to form zinc hydroxide precipitates, pouring an aqueous ammonia into the zinc hydroxide-containing mixture to convert the zinc hydroxide into an ammine complex salt of zinc and to obtain a transparent solution, and, if necessary, adding to the transparent solution a suitable additive such as a drying-preventing agent. In the above method, it is possible to use ammonia alone in place of the combination of an alkali metal hydroxide and ammonia. The ink composition is an alkaline solution generally having a pH of 8-14, preferably 9-13.

The thus obtained ink composition is colorless, transparent solution. When applied on a paper or cloth, however, the ink turns white, thereby giving white ink letters or patterns. The reason for this is considered to be because the colorless ammine complex salt of zinc is converted into white zinc hydroxide by losing its ammonia when it is applied on the paper or cloth.

The content of the zinc ammine complex salt in the ink composition is not specifically limited. The concentration is raised upto its solubility. Generally, the concentration of the zinc ammine complex salt is 0.5-30% by weight, preferably 2-20% by weight.

The ink composition of the present invention may contain any suitable additive. A drying-preventing agent such as an alkylene glycol, a polyalkylene glycol (including dialkylene glycol) having a molecular weight of 200-300 or glycerin may be advantageously used for improving the shelf life. The concentration of the drying-preventing agent is generally 2-25% by weight, preferably 5-20% by weight.

The ink composition may be used for various writing instruments such as felt-tip pens and porous plastic-tip pens. A writing instrument having an ink reservoir containing the ink composition according to the present invention can afford white written images on a colored paper or cloth. The written images can be erased by wiping with a cloth wet with an acidic solution such as an aqueous solution of hydrochloric acid, sulfuric acid, acetic acid, citric acid or succinic acid, or an ammoniacal liquid. The concentration of the acid or ammonia in the eraser liquid is desired to be low and can be suitably determined according to the concentration of the zinc ammine complex salt the ink composition. Such an eraser solution can be advantageously contained in an ink reservoir of a writing instrument such as a felt-tip pen.

The following examples will further illustrate the present invention.

EXAMPLE 1

In 100 g of water were dissolved 34 g of zinc chloride and into another 100 g of water were dissolved 14 g of potassium hydroxide. The both aqueous solutions were admixed with each other to obtain a mixture containing precipitates of zinc hydroxide. The mixture were added with 100 g of 28% aqueous ammonia to obtain a colorless zinc ammine complex salt solution (ink composition I).

EXAMPLE 2

The zinc ammine complex salt solution (100 g) obtained in Example 1 was mixed with 10 g of polyethylene glycol (molecular weight: 200) to obtain an ink composition II.

EXAMPLE 3

In 100 g of water were dissolved 80 g of zinc sulfate and in 50 g of water were dissolved 10 g of sodium hydroxide. The both aqueous solutions were admixed with each other to obtain a mixture containing precipitates of zinc hydroxide. The mixture were added with 100 g of 28% aqueous ammonia to obtain a colorless zinc ammine complex salt solution (ink composition III).

EXAMPLE 4

The zinc ammine complex salt solution (100 g) obtained in Example 1 was mixed with 5 g of glycerin to obtain an ink composition IV.

The thus obtained ink compositions I-IV were charged into ink reservoirs of conventional felt-tip pens. The resulting pens gave clear white ink images on a black paper and on a black cloth. The above ink compositions were also applied on a black paper by means of a brush, obtaining clear ink patterns. These ink images were able to be erased when wiped with a wet cloth impregnated with 3% aqueous ammonia. The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

I claim:

1. A colorless, transparent ink composition consisting essentially of an alkaline aqueous medium and an amine complex salt of zinc dissolved in said aqueous medium, said complex salt being the reaction product of ammonia and zinc hydroxide, said ink composition turning white upon use.

2. An ink composition as claimed in claim 1, further comprising a drying-preventing agent selected from the group consisting of glycerin, alkylene glycols and polyalkylene glycols having a molecular weight of 200–300.

3. An ink composition as claimed in claim 1, wherein the amount of said ammine complex salt of zinc is 0.5–30% by weight.

4. An ink composition as claimed in claim 1, and having a pH of 8–14.

5. An ink composition as claimed in claim 2, wherein the amount of said drying-preventing agent is 2–25% by weight.

* * * * *